United States Patent
Meier et al.

(10) Patent No.: US 10,246,826 B2
(45) Date of Patent: Apr. 2, 2019

(54) METHOD FOR OPERATING A MACHINE FOR PRODUCING AND/OR PROCESSING A MATERIAL WEB

(71) Applicant: SIEMENS AKTIENGESELLSCHAFT, Munich (DE)

(72) Inventors: Stefan Ingo Meier, Erlangen (DE); Wolf-Martin Rasenack, Marloffstein (DE)

(73) Assignee: Siemens Aktiengesellschaft, Munich (DE)

( * ) Notice: Subject to any disclaimer, the term of this patent is extended or adjusted under 35 U.S.C. 154(b) by 7 days.

(21) Appl. No.: 15/684,068

(22) Filed: Aug. 23, 2017

(65) Prior Publication Data

US 2018/0058006 A1 Mar. 1, 2018

(30) Foreign Application Priority Data

Aug. 29, 2016 (EP) ..................................... 16186077

(51) Int. Cl.
*D21F 7/04* (2006.01)
*B41F 33/18* (2006.01)
(Continued)

(52) U.S. Cl.
CPC .............. *D21F 7/04* (2013.01); *B41F 33/18* (2013.01); *B65H 26/025* (2013.01); *B65H 2515/704* (2013.01); *G01H 11/06* (2013.01)

(58) Field of Classification Search
USPC ....................................................... 162/255
See application file for complete search history.

(56) References Cited

U.S. PATENT DOCUMENTS 4,500,208 A * 2/1985 Sick ................... G01N 21/8901
 250/559.49
5,590,577 A 1/1997 Ruf et al.
(Continued)

FOREIGN PATENT DOCUMENTS

CN 87205367 U 8/1988
CN 1088647 6/1994
(Continued)

OTHER PUBLICATIONS

M. Anibal Valenzuela et al., "Sensorless Tension Control in Paper Machines", IEEE Transactions on Industry Applications, vol. 39, No. 2, Mar./Apr. 2003.

*Primary Examiner* — Mark Halpern
(74) *Attorney, Agent, or Firm* — Cozen O'Connor

(57) ABSTRACT

A method for operating a machine for producing and/or processing a material web, wherein a first drive unit is supplied by a converter with a current, a vibration propagating over the material web is captured via the first drive unit, the vibration is measured and transformed into a measurement signal that is examined for presence of a signature that differs from the basic waveform of the current, a web tear is thus identified if the signature propagating over the material web is missing during the evaluation of the electrical measurement signal, whereby no further sensors, in particular optical sensors, are required to capture the measurement signal, and the measurement also occurs independently of a torque, a speed or speed development of drive motors over time and, moreover, the detection of the web tear does not require a comparison measurement at the machine without a continuous material web.

15 Claims, 3 Drawing Sheets

(51) Int. Cl.
*B65H 26/02* (2006.01)
*G01H 11/06* (2006.01)

(56) References Cited

U.S. PATENT DOCUMENTS

| | | | | |
|---|---|---|---|---|
| 5,745,365 A * | 4/1998 | Parker | ............ | G01N 21/89 |
| | | | | 162/263 |
| 5,779,123 A * | 7/1998 | Richards | ............ | B41F 33/00 |
| | | | | 101/228 |
| 5,810,235 A * | 9/1998 | Hoynant | ............ | B41F 33/18 |
| | | | | 226/1 |
| 6,056,682 A * | 5/2000 | Belanger | ............ | B26D 1/605 |
| | | | | 493/340 |
| 6,259,109 B1 * | 7/2001 | Dalmia | ............ | G01N 21/8903 |
| | | | | 250/559.07 |
| 6,463,170 B1 | 10/2002 | Toivonen et al. | | |
| 2002/0017212 A1 | 2/2002 | Muller | | |
| 2007/0057208 A1 * | 3/2007 | Joss | ............ | G01N 21/8983 |
| | | | | 250/559.19 |
| 2010/0219964 A1 * | 9/2010 | Hunt | ............ | G01N 29/12 |
| | | | | 340/668 |
| 2015/0001270 A1 | 1/2015 | Merkel et al. | | |

FOREIGN PATENT DOCUMENTS

| | | |
|---|---|---|
| CN | 1264836 | 8/2000 |
| CN | 102301069 | 12/2011 |
| DE | 42 16 653 | 11/1993 |
| DE | 10129889 | 1/2002 |
| DE | 10 2007 000 697 | 3/2009 |
| DE | 102009006827 | 8/2010 |
| DE | 102012203002 | 8/2013 |

\* cited by examiner

METHOD FOR OPERATING A MACHINE FOR PRODUCING AND/OR PROCESSING A MATERIAL WEB

BACKGROUND OF THE INVENTION

1. Field of the Invention

The invention relates to a method for operating a machine for producing and/or processing a material web, where the machine comprises at least one drive unit with a drive motor and a converter.

2. Description of the Related Art

In producing and/or processing material webs, the demand for increased productivity results in ever greater production throughput of the machines, and consequently in ever greater speeds of the material webs and greater machine speeds.

Forces that act on a material web and are unproblematic even at low speeds, at high speeds result in phenomena, such as juddering of the material web, and consequently cause the material web to tear. Such uncontrolled and unwanted tears always result in a machine stoppage and therefore a production failure. A further problem associated with such tears is that the material web passes through the machine or a section of the machine in an uncontrolled manner if the occurrence of a tear is not identified quickly enough.

In this case, either the machine or sections of the machine are more or less contaminated or blocked by the material web or parts of the material web, possibly resulting in long cleaning times and/or damage to the machine, e.g., due to unwanted winding of a torn end of a material web.

Typical examples of machines for producing and/or processing material webs of paper, card, plastic film, metal lengths or foil, textiles or composite materials comprising two or more of these materials include inter alia paper machines, printing machines, rotary stamping machines, rotary cutting machines, or mill trains.

DE 42 16 653 A1 discloses exemplary methods and devices for identifying a tear in a material web in a machine for producing and/or processing the material web, where the material web is a paper web and the machine is a paper machine. The paper machine has a pressing part and a drying part comprising a plurality of drying groups, with the paper web being wound after passing through the drying part. If a region with free paper web tension is present between two drying groups, a light barrier whose light beam is directed onto the paper web can be used as a device for identifying a tear in the paper web. The functional principle of the light barrier is that the interruption by the paper web of the light path in the direction of an optical sensor is registered. If there is a tear in the paper web, light arrives at the sensor, which then generates an electrical signal by which the desired actions can be initiated. If a paper machine does not have any free paper tension in the region between the drying groups, DE 42 16 653 A1 proposes the arrangement of tear detectors in the region of the drying part, in order to be able to identify a tear in the paper web in that region of the drying part in which the paper web is arranged over a drier felt.

A tear detector has a transmit/receive unit, where the transmit unit beams visible light onto the paper web. The receive unit receives the light reflected off the paper web, where the light is broken down into normalized red, green and blue light values and optionally into brightness values. If a tear occurs in the paper web, then the visible light is no longer reflected off the paper web but off the drier felt in accordance with the color tone of the drier felt, and therefore the receive unit captures a change in the reflected light that allows the tear to be identified.

Such conventional methods and devices for identifying a tear in a material web in a machine for producing and/or processing the material web are usually based on optical sensor systems that quickly accumulate dirt in harsh manufacturing conditions and must therefore often be cleaned and readjusted to avoid measurement errors. As a result of optical sensor systems normally being arranged only at specific points on a machine, both rapid identification and accurate localization of a tear are prevented. Therefore, when using the conventional methods and devices based on optical sensor systems for identifying a tear in a material web, undesired delays often occur in the identification of a tear or the tear is not identified because material torn from the material web prevents the identification.

DE 10 2007 000 697 A1 also discloses a method for capturing a rip and/or determining an elasticity modulus of a material web in a machine for producing the same. The material web is driven at a desired speed via a drive entity at a first fixed point. A quantity corresponding to the elasticity modulus of the material web is determined by capturing and evaluating a torque curve of a current torque of the drive entity. In this case, an increase in the current torque of the drive device is used as a decision criterion to capture a paper tear. Alternatively, a decrease in a current torque of a second drive entity is used as a decision criterion.

The article "Sensorless Tension Control in Paper Machines" by M. Anibal Valenzuela, John Martin Bentley and Robert D. Lorenz published in IEEE TRANSACTIONS ON INDUSTRY APPLICATIONS, VOL. 39, NO. 2, MARCH/APRIL 2003 also proposes a method for determining a web tension of a paper web based on the current signals of the drives. In a first step, the current is measured when no web tension is present, i.e., without a paper web. In a second step, the current variations are measured while the paper web is moving.

SUMMARY OF THE INVENTION

In view of the foregoing, it is an object of the present invention to provide a method that allows better identification of a tear in a material web in a machine for producing and/or processing the material web.

This and other objects and advantages are achieved in accordance with the invention by a method for operating a machine for producing and/or processing a material web, where the machine comprises at least one drive unit with a drive motor and a converter, where a first drive unit is supplied by an assigned converter with a current having a basic waveform for the continuous movement of the material web, a vibration propagating over the material web during the movement of the material web is captured via the first drive unit, the vibration of the material web is measured by the converter of the first drive unit and transformed into an electrical measurement signal, the electrical measurement signal is examined by an evaluation device for presence of a signature that differs from the basic waveform of the current for the continuous movement of the material web, and where a web tear is identified if the signature propagating over the material web is missing during evaluation of the electrical measurement signal.

In addition, the object is inventively achieved by a control device for performing such a method.

Lastly, the object is inventively achieved by a machine for producing and/or processing a material web and comprising such a control device.

The advantages and preferred embodiments set forth below with respect to the method can logically be transferred to the control device and the machine for producing and/or processing a material web.

The invention is based on the notion of capturing mechanical vibrations that propagate over the material web, and evaluating the vibrations to identify a web tear. The examined vibrations may be those that are already present in the material web, e.g., caused by the movements and/or imbalances of the mechanical components of the machine and transferred to the continuous material web via the mechanical components. Alternatively, the mechanical vibrations that are captured may also be intentionally introduced into the material of the material web.

Each drive unit, comprising in particular at least a roller, a drive motor, a mechanical connection to the drive motor and a converter, is supplied by the assigned converter with current for the continuous movement of the material web. In this context, a converter is understood to be a frequency converter in particular. In the case of a direct-current drive, a converter is understood to be a power converter. This current is characterized by a basic waveform, i.e., characteristic amplitude, frequency and signal form (usually sinusoidal). In order to determine the current state of the material web, in particular to determine whether a web tear is present, knowledge of the basic waveform is required in this context. The current fed in by the converter results in the desired torque, which is directly proportional to the current. The torque is in turn associated with the rotational speed and the rotational frequency of the drive motor, such that these are likewise proportional to the current of the converter.

The mechanical vibrations in the material web, irrespective of whether these occur passively or are generated actively by the control of the drive units, are captured by the drive unit in the form of an electrical measurement signal. Provision is made here for measuring a physical variable, such as a current, a torque or a rotational frequency. The electrical measurement signal into which the physical variable is converted for the purpose of evaluation is a current or other electrical measurement variable that correlates to the current, e.g., a voltage. For example, the electrical measurement signal is read out directly as current by current sensors of the converter. Alternatively, if another measurement variable, such as a torque, is captured, this is transformed into current for the subsequent evaluation. For the purposes of the evaluation, the examined vibrations represent a signature that is additively superimposed on the current for the movement of the material web. This signature differs in at least one characteristic from the basic waveform of the current that is fed in by the converter for the continuous movement of the material web. The signature can therefore be extracted and unambiguously identified as a separate signal.

The signature is finally used to identify a state of the material web. Provision is first made for checking whether the signature is indeed contained in the electrical measurement signal. An absence of the signature propagating over the material web indicates that the material web has torn and the vibration could therefore no longer be captured. In this case, corresponding maintenance measured must be initiated to restore normal operation of the machine.

If the expected signature is present, then it can first be inferred that the material web is still at least partially intact. The measurement of the signature is then used for further evaluations in particular.

Only vibrations that propagate over the material web are relevant for the evaluation. Vibrations that are included in the measurement signal from, e.g., the mechanical connections of the various parts of the machine for producing and/or processing of the material web are not taken into account for the evaluation.

The method is characterized in that no further sensors, in particular optical sensors, are required for the purpose of capturing the measurement signal. The measurement also occurs independently of a torque, a speed or speed development of the drive motors over time. Moreover, the detection of the web tear does not require a comparison measurement at the machine without a continuous material web. The method can therefore be applied during the continuous operation of an existing machine without additional hardware and without any interruption or disruption of the operation.

In accordance with a preferred embodiment, the machine comprises at least two drive units and the signature is introduced into the material web via the drive motor of a second drive unit. In this context, a signature is actively generated in the form of an additional current (or, e.g., an additional torque which correlates to the current) having a known waveform, where the signature is introduced into the material web via one of the drive units and captured via another drive unit. The main advantages of actively introducing a signature into the material web, with the signature propagating as a vibration both in the production direction of the material web and against the production direction, are that the waveform of the signature is known at all times and the strength of the signal can be adapted, whereby the unambiguous detection and assignment of the signature is particularly easy, even if the waveform of the signature is changed over time.

In accordance with a preferred embodiment, the signature has frequency components that are higher than a frequency of the basic waveform of the current that is fed in by the converter. By virtue of the higher frequency of the signature, the signature can be detected more quickly because less time is required to identify the signature than in the case of a signature having a lower frequency.

In an appropriate embodiment, the signature that is introduced is generated as a type of current having a sinusoidal, blocked or pulsed form. This signature is additively superimposed on the current that is supplied to the drive motor by the converter. As a result of the predetermined characteristic form of the signature, it is particularly easy to subsequently extract the signature.

With regard to accurate localization of a tear in the material web, a different signature is advantageously introduced into the material web in each case via the drive units. If a plurality of drive units are present in the machine and a different signature is introduced by each drive unit, then the respective signatures are unambiguously assigned to the drive units. If there is a web tear between two adjacent drive units, then at least one of the drive units will not be able to receive the signature from the adjacent drive unit. The position of the web tear is therefore accurately localized between these two drive units.

Provision is preferably made for at least three drive units, where evaluation of the signature of an intermediate drive unit is performed both in and against the production direction of the material web. A particularly extensive and reliable evaluation is performed in this type of configuration, because the signature introduced by each drive unit that is situated between two further drive units is read out and evaluated on both sides by the adjacent drive units. The position of the web tear can therefore be localized in a particularly reliable manner, not only in the production direction but also against the production direction.

If the signature is present, a web tension of the material web is preferably determined based on the amplitude of the signature. This involves taking both physical variables of the material web and the transfer characteristics of the material web into consideration. Physical variables and transfer characteristics of the material web are understood to particularly mean a width and a thickness of the material web, and a composition of the material that influences the vibration characteristics of the material web. It is also possible in particular to use a material temperature, an ambient temperature, a water component in the material and/or a humidity. It also applies in this case that greater tautness of the material web results in lower attenuation over the web length and therefore improves the propagation of the signature accordingly. Here, a higher amplitude of the signature is measured than if the material web is slack and the signature is attenuated. Based on the measured amplitude and with reference to the known physical interdependencies between the above cited variables, the web tension of the material web and/or the temporal development thereof is quantitatively calculated.

In a further preferred embodiment, the determination of the web tension is used for open-loop control or closed-loop control of an operating parameter of at least one drive motor. Operating parameters here include, for example, the rotational speed, the torque or the rotational frequency and any further correlated variables. In accordance with distilled embodiments of the invention, at least one operating parameter is adapted based on the measurement of the signature and hence the web tension. For example, the web tension is increased if the attenuation of the signature increases, and vice versa, the web tension is automatically reduced if the amplitude of the signature increases.

The method in accordance with disclosed embodiments is advantageously performed on a material web made of paper, metal, film/foil or textile material. Correspondingly, the machine for producing and/or processing a material web is preferably a paper machine, a printing machine, a mill train for producing metal, a rotary stamping machine and/or a rotary cutting machine. The performance of the method is not limited to the above cited material webs and machines, the above list being merely exemplary and not conclusive.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in greater detail below with reference to a drawing, this comprising schematic and greatly simplified figures in which.

DETAILED DESCRIPTION OF THE EXEMPLARY EMBODIMENTS

Figure 1:
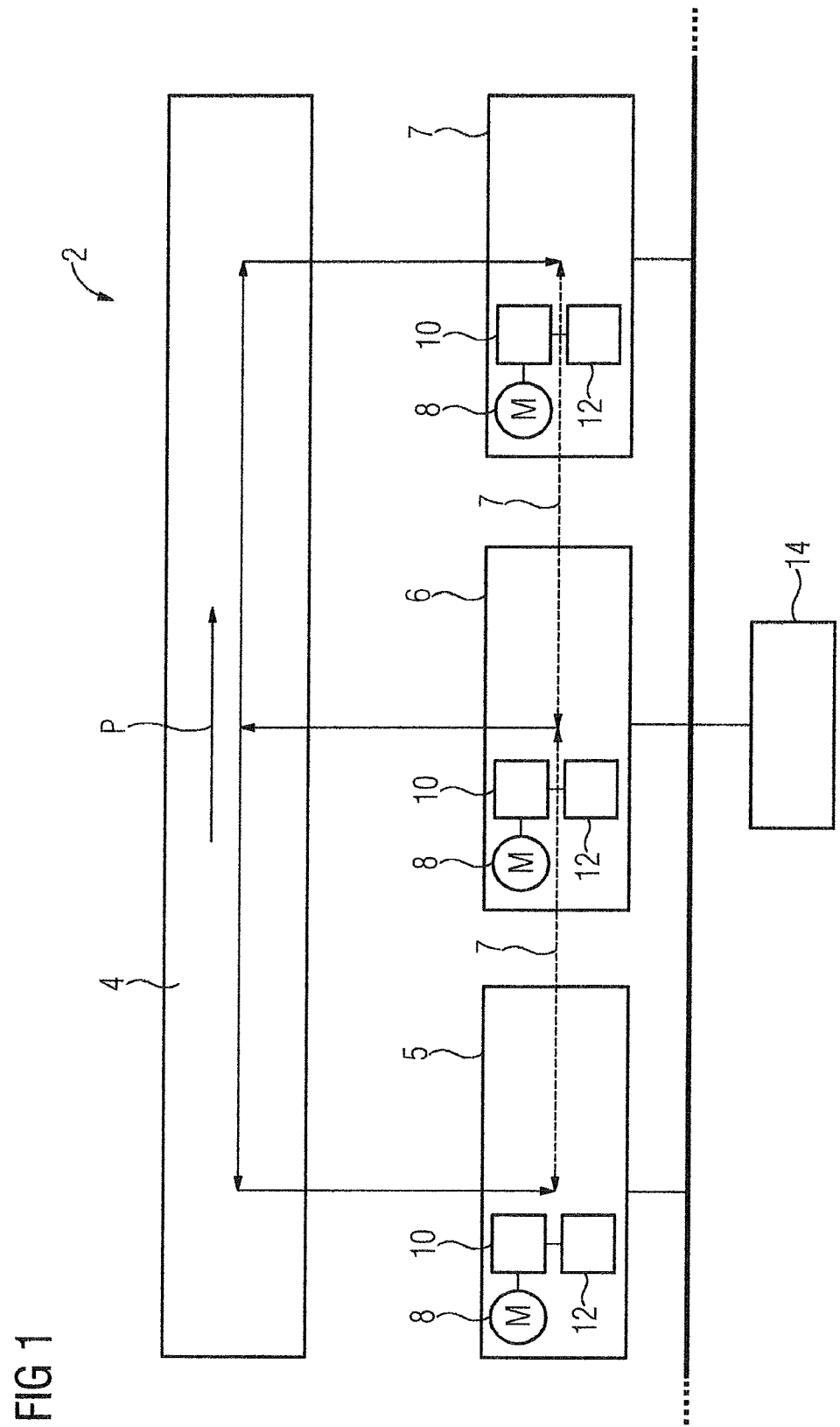
FIG. 1 shows a machine for producing and/or processing a material web.

FIG. 1 schematically illustrates a machine 2 for producing and/or processing a continuous material web 4, in particular a paper machine for producing a paper web. The paper machine 2 comprises a plurality of drive units 5, 6, 7, of which only three are illustrated. Each drive unit 5, 6, 7 has a drive motor 8 that is supplied with current I by a converter 10 for continuously moving the material web 4 in a production direction P. The machine 2 further comprises evaluation devices 12 that are assigned to the respective converter 10 in the illustrated embodiment. Moreover, a control device 14 is provided for open-loop or closed-loop control of the paper machine 2. The drive units 5, 6, 7 can also communicate with each other, this being indicated by the broken-line arrows 9.

During operation of the paper machine 2, mechanical vibrations propagate along the material web 4. A plurality of additively superimposed vibrations are usually present, having various causes. These may occur passively (i.e., without intentional action of the control device 14) as a result of movements or vibrations of the mechanical components of the paper machine 2 during operation. Alternatively, the vibrations may be actively generated by a converter 10 and introduced via the drive units 5, 6, 7 into the material of the material web 4. In both cases, the vibrations of the material web 4 are read out by an evaluation device 12 as an electrical measurement signal, in particular a current or a variable that correlates to the current. The electrical measurement signal is then evaluated by the evaluation device 12 with regard to an expected vibration and signature S.

Figure 2:
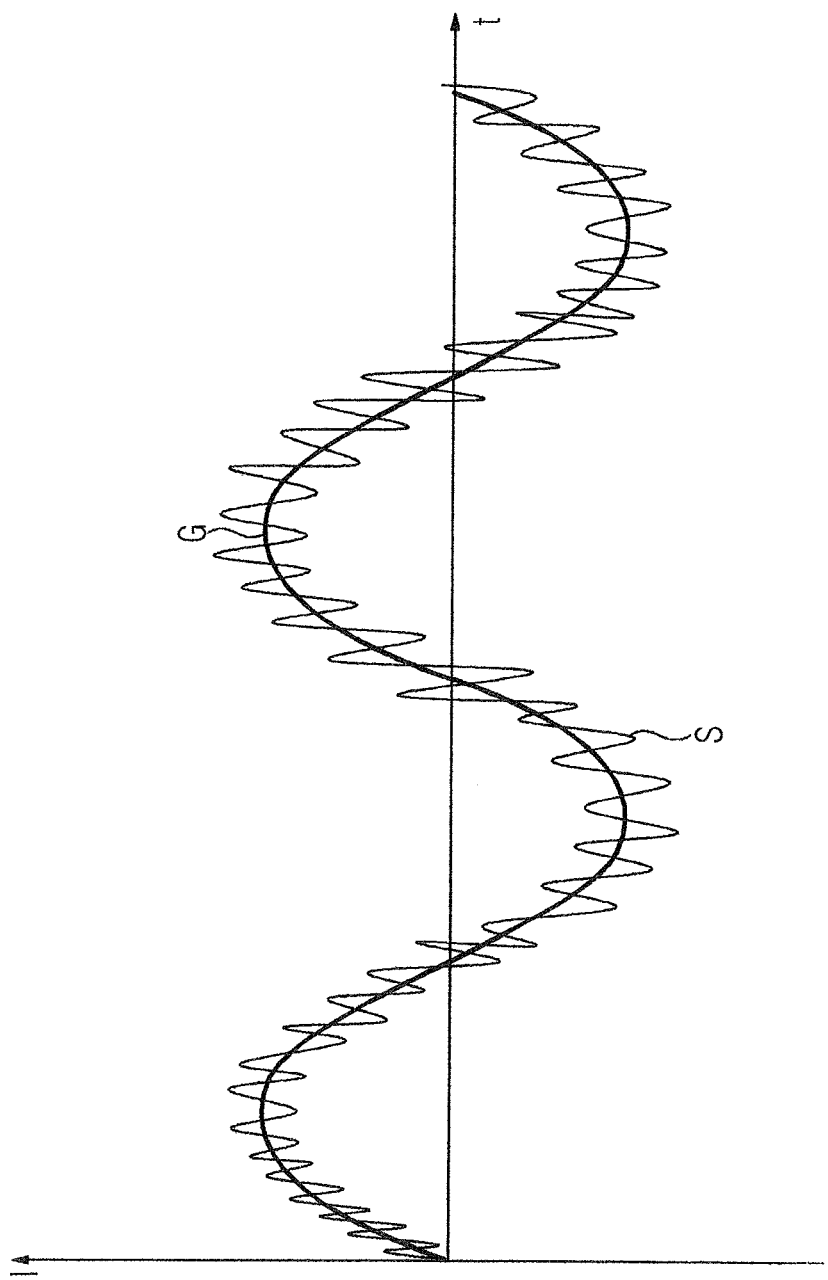
FIG. 2 shows the temporal waveform of a current which is overlaid with a signature.

This situation can be seen from the illustration of the current waveform I over time t, as per FIG. 2. The current I, which is fed into the drive motor 8 by the converter 10, has a basic waveform G that is characterized in particular by a frequency, an amplitude and a form (here sinusoidal). The signature S is additively superimposed on the current I. The signature S is selected such that it differs from a basic waveform G of the current of the drive unit 5, 6, 7 at which the vibrations are measured. In the illustrated exemplary embodiment, the signature S has a lower amplitude and a higher frequency than the basic waveform.

If the signature S is missing during the evaluation by the evaluation device 12, then this indicates a web tear upstream of the drive unit 5, 6, 7 at which the measurement is performed.

If the signature S can be read out, it is used by the evaluation device 12, in particular for further evaluations. For example, a web tension of the material web is calculated and adjusted by the control device 14 based on an amplitude of the measured signature S.

A particularly reliable identification of a web tear of the material web 4 is achieved if the signature S is generated and introduced into the material web 4 by a first drive unit 5, and read out and evaluated by a second, in particular adjacent, drive unit 6. If the signature S does not arrive at the adjacent drive unit, the position of the web tear is situated between the two drive units 5, 6.

In particular, each drive unit 5, 6, 7 generates a different signature S, which is detected by the adjacent drive units 5, 6, 7 both in a production direction P and against the production direction P. For example, according to FIG. 1 a specific signature S having a frequency of 60 Hz is introduced into the material web 4 by the central drive unit 6 and is read out by both the drive unit 5 and the drive unit 7. The converter 10 of the drive unit 5 introduces a further signature having a frequency of 50 Hz and the converter 10 of the drive unit 5 introduces a third signature having a frequency of 70 Hz into the material web 4. The signatures of the drive units 5 and 7 are both read out by the drive unit 6. As a result of the different frequency of the signatures, the assignment of the signatures to the respective drive unit 5, 7 is unambiguous.

The signatures S that are introduced have a sinusoidal, blocked or pulsed current waveform, for example. They are also characterized by frequency components that are higher than a frequency of the basic waveform G of the current I that is fed in by the converter 10. It is likewise possible to generate non-periodic signatures S whose waveform is temporally variable or in which specific periodic sequences can be repeated alternately. In the case of actively introduced signatures S, their waveform is always known and therefore it is easy to identify the signature S irrespective of the variations in its waveform.

Figure 3:
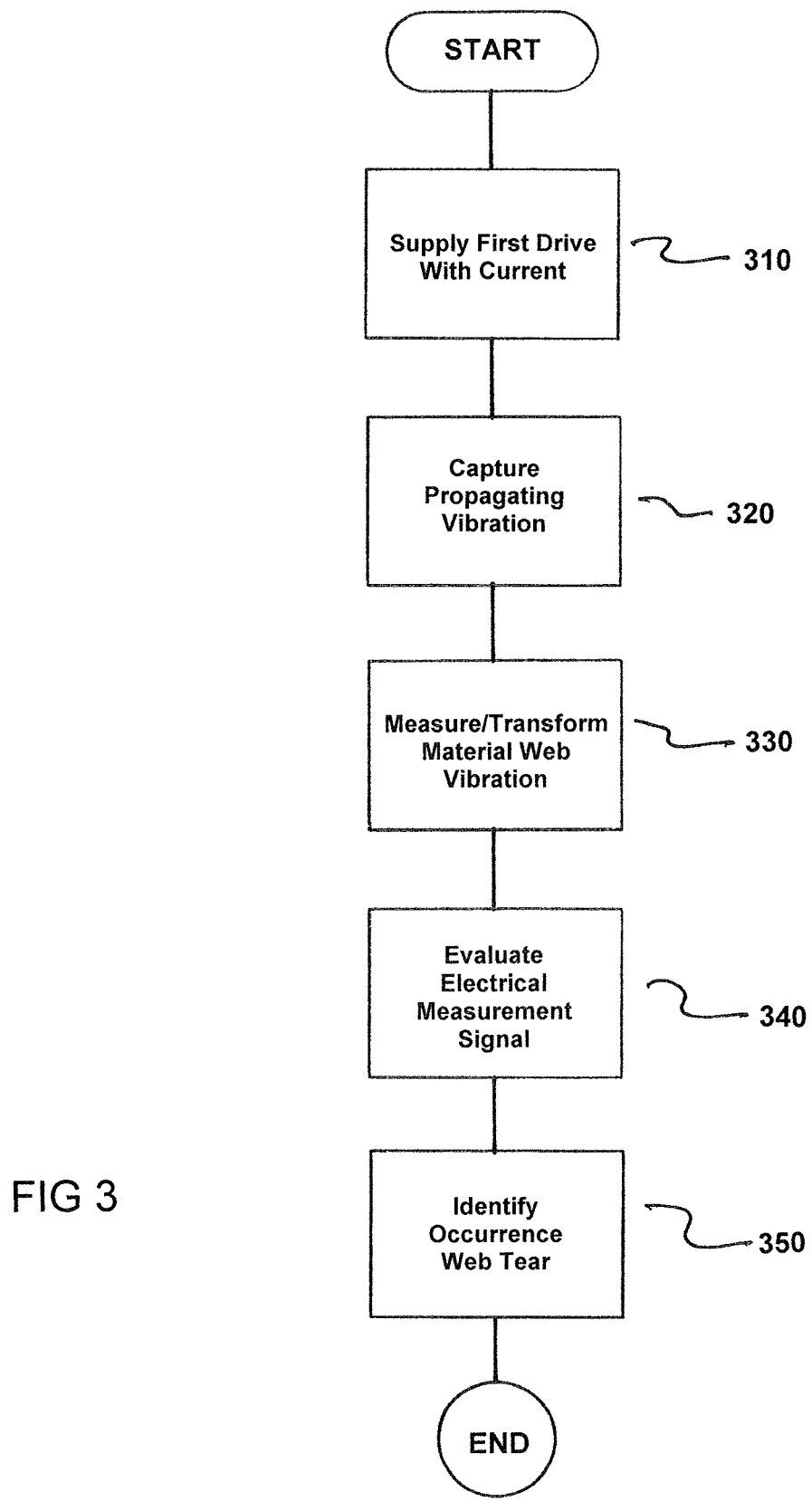
FIG. 3 is a flowchart of the method in accordance with the invention.

FIG. 3 is a flowchart of the method for operating a machine 2 for producing and/or processing a material web 4, where the machine comprises at least one drive unit 5, 6, 7 with a drive motor 8 and a converter 10. The method comprises supplying a first drive unit 5, 6, 7 via an assigned converter 10 with a current I having a basic waveform G continuous movement of the material web 4, as indicated in step 310.

Next, a vibration propagating over the material web 4 during the movement of the material web 4 is captured via the first drive unit 5, 6, 7, as indicated in step 320.

Next, the vibration of the material web 4 is measured by the converter 10 of the first drive unit and transformed into an electrical measurement signal, as indicated in step 330.

Next, the electrical measurement signal is examined by an evaluation device 12 for presence of a signature S that differs from the basic waveform G of the current I for the continuous movement of the material web 4, as indicated in step 340.

A web tear is now identified if the signature S propagating over the material web 4 is missing during the evaluation of the electrical measurement signal, as indicated in step 350.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method operating a machine for at least one of produce and processing a material web, the machine comprising at least one drive unit with a drive motor and a converter, the method comprising:
   supplying a first drive unit via an assigned converter with a current having a basic waveform continuous movement of the material web;
   capturing a vibration propagating over the material web during the movement of the material web via a first drive unit;
   measuring the vibration of the material web by a converter of the first drive unit and transforming the measured vibration into an electrical measurement signal;
   evaluating the electrical measurement signal via an evaluation device to determine a presence of a signature which differs from the basic waveform of the current for the continuous movement of the material web; and
   identifying that a web tear has occurs if the signature propagating over the material web is missing during the evaluation of the electrical measurement signal.

2. The method as claimed in claim 1, wherein the machine comprises at least two drive units and the signature is introduced into the material web via a drive motor of a second drive unit.

3. The method as claimed in claim 2, wherein the signature has frequency components which are higher than a frequency of the basic waveform of the current that is fed in by the converter.

4. The method as claimed in claim 2, wherein the signature that is introduced is generated as a type of current having one of (i) a sinusoidal, (ii) blocked and (iii) pulsed form.

5. The method as claimed in claim 4, wherein a different signature is introduced into the material web (4) in each case via the at least one drive unit.

6. The method as claimed in claim 2, wherein a different signature is introduced into the material web (4) in each case via the at least one drive unit (5, 6, 7).

7. The method as claimed in claim 1, wherein the signature has frequency components which are higher than a frequency of the basic waveform of the current that is fed in by the converter.

8. The method as claimed in claim 7, wherein the signature that is introduced is generated as a type of current having one of (i) a sinusoidal, (ii) blocked and (iii) pulsed form.

9. The method as claimed in claim 7, wherein a different signature is introduced into the material web in each case via the at least one drive unit.

10. The method as claimed in claim 1, wherein at least three drive units are provided; and wherein evaluation of the signature of a central drive unit of the at least three drive units is performed in a production direction of the material web and in a direction opposite to the production direction.

11. The method as claimed in claim 1, wherein if the signature is present then a web tension of the material web is determined based on an amplitude of the signature.

12. The method as claimed in claim 11, wherein the determination of the web tension is used for at least one of (i) open-loop control and (ii) closed-loop control of an operating parameter of at least one drive motor.

13. The method as claimed in claim 1, wherein the method is performed on a material web made of one of (i) paper, (ii) metal, (iii) film/foil and (iv) textile material.

14. A control device, the control device being configured to:

supply a first drive unit via an assigned converter with a current having a basic waveform continuous movement of the material web;

capture a vibration propagating over the material web during the movement of the material web via a first drive unit;

measure the vibration of the material web by a converter of the first drive unit and transforming the measured vibration into an electrical measurement signal;

evaluate the electrical measurement signal via an evaluation device to determine a presence of a signature which differs from the basic waveform of the current for the continuous movement of the material web; and identify that a web tear has occurs if the signature propagating over the material web is missing during the evaluation of the electrical measurement signal.

15. A machine for at least one of (i) producing and (ii) processing a material web, comprising the control device as claimed in claim 14.

\* \* \* \* \*